(12) United States Patent
Hasenberg

(10) Patent No.: US 10,538,430 B2
(45) Date of Patent: Jan. 21, 2020

(54) SYSTEM AND METHOD FOR CONTAINING AN EMISSION OF SULFUR TRIOXIDE

(71) Applicant: Chevron Phillips Chemical Company LP, The Woodlands, TX (US)

(72) Inventor: Daniel M. Hasenberg, Kingwood, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 57 days.

(21) Appl. No.: 15/873,227

(22) Filed: Jan. 17, 2018

(65) Prior Publication Data
US 2018/0141815 A1  May 24, 2018

Related U.S. Application Data

(62) Division of application No. 14/963,795, filed on Dec. 9, 2015, now Pat. No. 9,890,042.

(51) Int. Cl.
*C01B 17/69* (2006.01)
*B01D 53/14* (2006.01)

(52) U.S. Cl.
CPC .......... *C01B 17/69* (2013.01); *B01D 53/1481* (2013.01); *B01D 2252/2056* (2013.01); *B01D 2257/302* (2013.01)

(58) Field of Classification Search
None
See application file for complete search history.

(56) References Cited

U.S. PATENT DOCUMENTS

| | | | | |
|---|---|---|---|---|
| 2,992,065 A | * | 7/1961 | Feustel | C01B 17/60 422/160 |
| 4,915,912 A | * | 4/1990 | Walles | C01B 17/69 422/160 |
| 7,541,011 B2 | | 6/2009 | Hu | |
| 7,846,407 B2 | | 12/2010 | Hu | |
| 2002/0197198 A1 | | 12/2002 | Jacobson et al. | |

(Continued)

FOREIGN PATENT DOCUMENTS

| | | | |
|---|---|---|---|
| CN | 2709446 | * | 7/2005 |
| CN | 101690852 A | | 4/2010 |
| GB | 1234862 | * | 6/1971 |

OTHER PUBLICATIONS

CN 101690852, published 2010, machine translation, 4 pages.
(Continued)

*Primary Examiner* — Sheng H Davis
(74) *Attorney, Agent, or Firm* — Conley Rose, P.C.

(57) ABSTRACT

A system for containing an emission of sulfur trioxide, the system comprising a first pressurized vessel, the first pressurized vessel containing sulfur trioxide, a relief vessel containing a volume of a solvent solution, wherein the solvent solution comprises sulfolane, and a first relief conduit providing a first route of fluid communication between the first pressurized vessel and the relief vessel. A method for containing an emission of sulfur trioxide, the method comprising routing a first relief conduit so as to provide a first route of fluid communication between a first pressurized vessel and a relief vessel, wherein the first pressurized vessel contains sulfur trioxide, wherein the relief vessel contains a volume of a solvent solution, and wherein the solvent solution comprises sulfolane.

18 Claims, 3 Drawing Sheets

(56) References Cited

U.S. PATENT DOCUMENTS

| | | | |
|---|---|---|---|
| 2003/0060644 A1* | 3/2003 | Barnicki | C07D 301/32 |
| | | | 549/541 |
| 2008/0264254 A1* | 10/2008 | Song | B01D 53/02 |
| | | | 95/116 |
| 2009/0263302 A1 | 10/2009 | Hu | |
| 2010/0062925 A1 | 3/2010 | Morton et al. | |
| 2010/0303700 A1 | 12/2010 | Palla et al. | |
| 2011/0052458 A1 | 3/2011 | Hu | |
| 2012/0321538 A1 | 12/2012 | Hu | |
| 2014/0301930 A1 | 10/2014 | Delfort et al. | |
| 2015/0038759 A1 | 2/2015 | Doong et al. | |
| 2017/0166448 A1 | 6/2017 | Hasenberg | |

OTHER PUBLICATIONS

Office Action (Restriction Requirement) dated Feb. 9, 2017 (6 pages), U.S. Appl. No. 14/963,795 filed Dec. 9, 2015.
Office Action dated Apr. 7, 2017 (24 pages), U.S. Appl. No. 14/963,795, filed Dec. 9, 2015.
Office Action (Final) dated Sep. 19, 2017 (21 pages), U.S. Appl. No. 14/963,795, filed Dec. 9, 2015.
Notice of Allowance dated Nov. 29, 2017 (9 pages), U.S. Appl. No. 14/963,795, filed Dec. 9, 2015.

* cited by examiner

SYSTEM AND METHOD FOR CONTAINING AN EMISSION OF SULFUR TRIOXIDE

CROSS-REFERENCE TO RELATED APPLICATIONS

This application is a divisional of and claims priority to U.S. patent application Ser. No. 14/963,795 filed Dec. 9, 2015, published as U.S. Patent Application Publication US 2017/0166448 A1 and entitled "System and Method for Containing an Emission of Sulfur Trioxide," which is incorporated by reference herein in its entirety.

BACKGROUND

Sulfur trioxide ($SO_3$) is a powerful sulfonating agent used industrially in a variety of processes. However, sulfur trioxide is also recognized as being hazardous in nature, for instance, being known to react violently with water; being corrosive to skin, eyes, mucous membranes, and the respiratory tract; being highly caustic; and being known to fume or disperse readily in the air. As in any industrial setting where industrial chemicals are used, there is the possibility that sulfur trioxide can be released, either unintentionally (i.e., accidentally or through an unintended event) or occurring from the normal operation of such an industrial use.

As such, systems and methods for containing an emission of sulfur trioxide from industrial settings where sulfur trioxide can be found or is in use are needed.

SUMMARY

Disclosed herein is a system for containing an emission of sulfur trioxide, the system comprising a first pressurized vessel, the first pressurized vessel containing sulfur trioxide, a relief vessel containing a volume of a solvent solution, wherein the solvent solution comprises sulfolane, and a first relief conduit providing a first route of fluid communication between the first pressurized vessel and the relief vessel.

Also disclosed herein is a method for containing an emission of sulfur trioxide, the method comprising routing a first relief conduit so as to provide a first route of fluid communication between a first pressurized vessel and a relief vessel, wherein the first pressurized vessel contains sulfur trioxide, wherein the relief vessel contains a volume of a solvent solution, and wherein the solvent solution comprises sulfolane.

Further disclosed herein is a method for containing an emission of sulfur trioxide, the method comprising directing an emission of sulfur trioxide from a first pressurized vessel to a relief vessel via a first relief conduit, wherein the relief vessel contains a volume of a solvent solution, comprising sulfolane, and forming an emission mixture comprising sulfur trioxide dissolved in sulfolane within the relief vessel.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Disclosed herein are systems and methods for containing an emission of sulfur trioxide ($SO_3$). The disclosed embodiments of a sulfur trioxide emission containment (STEC) system and associated method are useful where sulfur trioxide is employed as an input to an industrial process (for example, as a process reactant); where $SO_3$ is an output from an industrial process (for example, where sulfur trioxide is a process product or where excess, unreacted sulfur trioxide remains); and/or where sulfur trioxide is stored (for example, in a storage facility) or transported (for example, by truck or rail-car).

Figure 1:
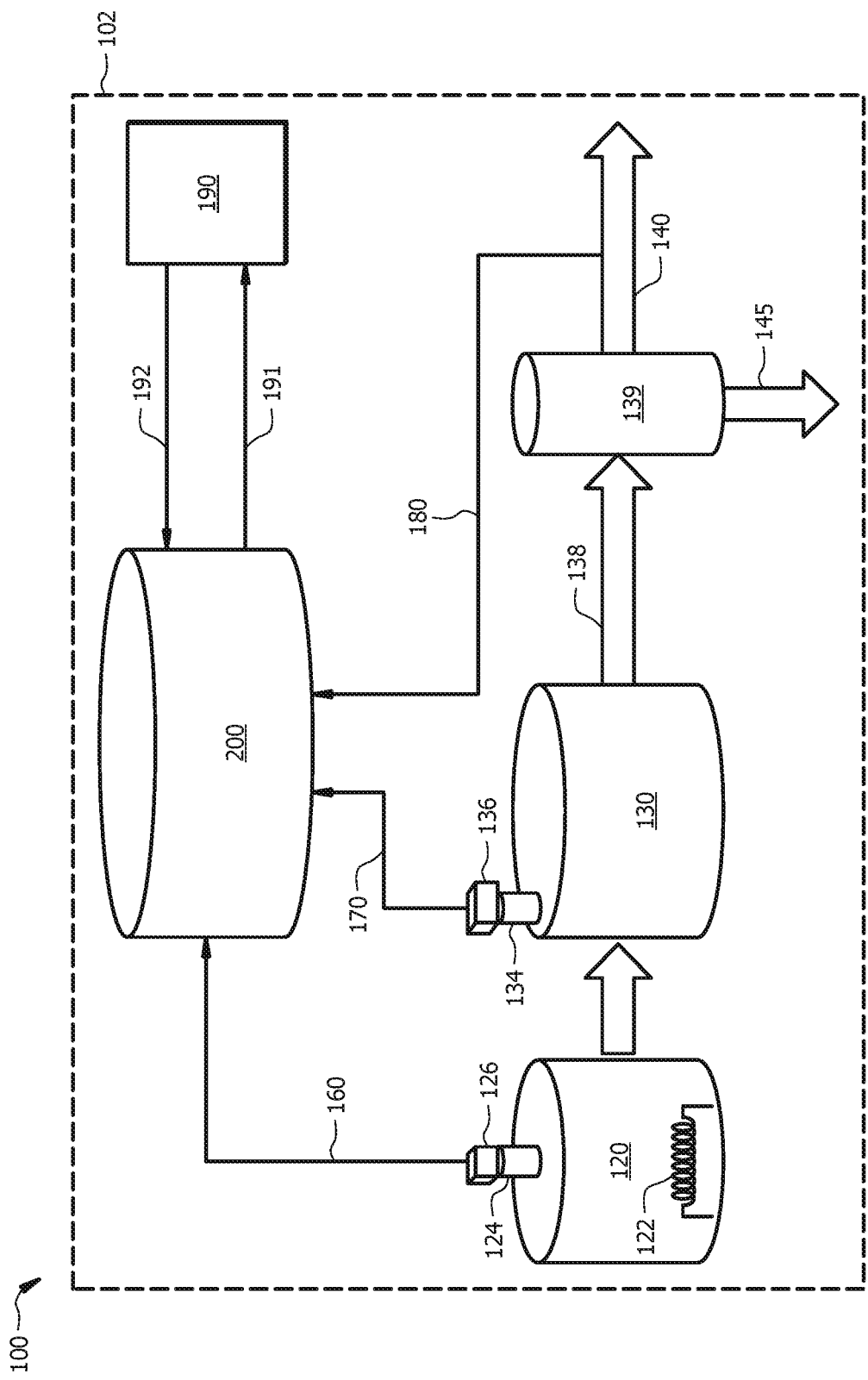
FIG. 1 illustrates an embodiment of a sulfur trioxide emission containment system.

Referring to FIG. 1, an exemplary STEC system 100 in accordance with embodiments of the present disclosure is illustrated. The STEC system 100 as shown in FIG. 1 represents an industrial setting, for example, an industrial environment in which sulfur trioxide is present (e.g., used as a reactant) in an industrial process. For example, STEC system 100 of FIG. 1 can be an industrial plant (e.g., a production facility) of the type used to produce a sulfated or sulfonated end-product. Examples of such industrial facilities include plants for the production of sulfonated asphalt and plants for the production of surfactant compositions, such as those used in shampoos, detergents, or the like. In alternative embodiments, as will be disclosed herein, an otherwise similar STEC system can be similarly employed in any suitable setting or environment where sulfur trioxide is used or is otherwise present. Examples of such environments include the production of sulfonic and/or sulfuric acid, the production of catalyst(s), specific refining applications, flue gas emissions produced during the burning of coal or other fossil fuels.

Generally, in accordance with the instant disclosure, an STEC system comprises a sulfur trioxide source, a relief vessel containing a solvent solution, and a relief conduit providing a route of fluid communication from the sulfur trioxide source to the relief vessel. As used herein, a sulfur trioxide source refers to a point at which sulfur trioxide can be stored, input into a system, used within a system, output or withdrawn from a system, or any other point within a system from which sulfur trioxide can be collected or output. While one or more of the embodiments disclosed herein can illustrate particular sources of sulfur trioxide, the person of ordinary skill in the art will, upon review of this disclosure, recognize that sulfur trioxide can be similarly collected, contained, or output from any number or combination of sulfur trioxide sources.

Referring again to the embodiment of FIG. 1, the STEC system 100 comprises a first sulfur trioxide source that is a storage vessel 120, a second sulfur trioxide source that is a reactor 130, a third sulfur trioxide source that is an output conduit 140, a relief vessel 200 containing a solvent solution, a first relief conduit 160, a second relief conduit 170, and a third relief conduit 180. While the embodiment of FIG. 1 illustrates a first, second, and third sulfur trioxide sources (e.g., storage vessel 120, reactor 130, and output conduit 140), in additional or alternative embodiments, an otherwise similar STEC system can include any one or additional sulfur trioxide sources.

In the embodiment of FIG. 1, the storage vessel 120 (that is, the first sulfur trioxide source) contains a volume of sulfur trioxide. The storage vessel 120 can comprise a permanent or semi-permanent fixture at the site of the STEC system 100, for example, a tank or tank battery, or the like. Alternatively, the storage vessel 120 can comprise a mobile or movable vessel, for example a rail-car container, a trailer container, a tote, a skid-mounted container, or the like. The storage vessel 120 can have any suitable volume, for example and without limitation, about 1,000 gallons (3800 liters), alternatively, about 2,500 gal. (9500 liters), alternatively, about 5,000 gal. (19,000 liters), alternatively, about 10,000 gal. (38,000 liters), alternatively, about 15,000 gal. (57,000 liters), alternatively, about 20,000 gal. (76,000 liters), alternatively, about 25,000 gal. (95,000 liters), alternatively, about 30,000 gal. (114,000 liters), alternatively, about 35,000 gal. (133,000 liters) (e.g., a rail-car, having a maximum capacity of about 34,500 gal. (131,000 liters)), as well as volumes between any two of these suitable volumes, e.g., about 12,500 gal. (47,000 liters).

In the embodiment of FIG. 1, the storage vessel 120 comprises a heating element 122. Because sulfur trioxide exhibits a freezing/melting temperature of about 62.4° F. (16.9° C.), the heating element 122 can be provided for the purpose of maintaining the sulfur trioxide in liquid or a substantially liquid state, for example, such that the volume of sulfur trioxide stored in the storage vessel 120 remains sufficiently free-flowing. The heating element can be conventional, for example, a metallic element, a ceramic element, a composite element, or the like, as well as combinations thereof, and can be sized accordingly to the volume of the storage vessel and/or the desired temperature to be maintained.

With continued reference to the embodiment of FIG. 1, the storage vessel 120 further comprises a vent 124. For example, the vent 124 can be provided for the purpose of ensuring that a safe or desired internal pressure is not exceeded (e.g., a pressure relief vent). By way of further example, heating the volume of sulfur trioxide stored in the storage vessel and/or changes in environmental conditions can contribute to a rise in the internal pressure of the storage vessel 120. Also, in an embodiment, the vent 124 can include a pressure relief valve 126, for example, configured to allow pressure within the storage vessel to escape when a particular pressure threshold is exceeded. In such an embodiment, the pressure relief valve can be configured to actuate (e.g., to allow pressure to be released) at a pressure of at least about 5 pounds per square inch (p.s.i. or 34.5 kilopascals), alternatively, about 10 p.s.i. (69 kPa), alternatively, about 15 p.s.i. (103 kPa), alternatively, about 20 p.s.i. (138 kPa), alternatively, about 25 p.s.i. (172 kPa), alternatively, about 30 p.s.i. (207 kPa), alternatively, about 40 p.s.i. (276 kPa), alternatively, about 50 p.s.i (345 kPa).

In the embodiment of FIG. 1, the reactor 130, can be any suitable reactor, for example, a chemical reactor generally configured to contain and/or control a chemical reaction, for example, a sulfurization reaction. The reactor 130 can comprise any suitable type or configuration of chemical reactor, for example, to accommodate two or more reactants, catalysts, solvents, and/or inert materials and to allow for the control of various process variables including residence time, temperature, pressure, concentration of the reactants and/or products, and combinations thereof. For example, the reactor 130 can comprise a tank configuration or a pipe/tubular configuration (e.g., a "loop" reactor). In various embodiments, the reactor 130 can be operated in accordance with a batch reactor model, a continuous stirred-tank reactor model, or a plug flow reactor model.

In the embodiment of FIG. 1, the reactor 130 receives sulfur trioxide from the storage vessel 120 for use as a reactant. The reactor 130 can receive additional chemical reactants by way of other or separate reactant and/or reagent transfer lines (not shown) from various other sources (e.g., asphalt, alcohols, ethoxylated alcohols, brightstock, or alkyl benzene), as suitable for the chemical reaction being carried out within the reactor 130.

The reactor 130, similar to the storage vessel 120, can comprise a vent 134 for the purpose of ensuring that a safe or desired internal pressure within reactor 130 is not exceeded. Also, in an embodiment, the vent 134 can include a pressure relief valve 136 configured to allow pressure within the reactor 130 to escape when a particular pressure threshold is exceeded.

Following residence within reactor 130, the reactor 130 outputs an effluent or output stream 138 comprising product and various unreacted components (e.g., excess reactants, solvents, inert materials, or catalysts) that is conveyed away from the reactor, for example, for further processing. For example, in the embodiment of FIG. 1, the output stream 138 is directed to a separation unit 139 configured to separate the product (e.g., sulfonated asphalt, alcohol sulfuric acid, alkyl benzene sulfonic acid, petroleum sulfonates, or oleum) from some or all of the unreacted components. The separation unit 139 can comprise any suitable type or configuration of one or more separation units dependent upon the product and unreacted components being separated. Examples of separation units include, but are not limited to distillation/fractionation columns, settling tanks, cyclonic separators, filtration units, centrifugation systems, electrostatic precipitation units, or the like. In the embodiment of FIG. 1, the separation unit 139 separates the output stream 138 into an unreacted component stream that is conveyed away from the separation unit 139 via the output conduit 140 (e.g., a "top stream" or "side stream") and a product stream that is conveyed away from the separation unit 139 via a product conduit 145 (e.g., a "bottoms stream"). In the embodiment of FIG. 1, the unreacted component stream within the output conduit 140 comprises sulfur trioxide (e.g., unreacted sulfur trioxide from the reactor 130) and, as such, at least a portion of this stream can be directed to the relief vessel 200, as will be detailed herein. In an alternative embodiment, all or a portion of any stream comprising sulfur trioxide can be similarly conveyed to the relief vessel 200 by any number of conveyance means, including fluid transfer lines and the like. Also, while the embodiment of FIG. 1 illustrates only a single separation unit 139, in additional or alternative embodiments, any suitable number and arrangement of separation units can be employed, for example, to separate a particular stream (e.g., a stream output by a reactor or by another separation unit) into two or more substituent components.

Referring again to the embodiment of FIG. 1, the first relief conduit 160 provides a route of fluid communication between the vent 124 of the storage vessel 120 and the relief vessel 200. Similarly, in the embodiment of FIG. 1, the second relief conduit 170 provides a route of fluid communication between the vent 134 of the reactor 130 and the relief vessel 200, and the third relief conduit 180 provides a route of fluid communication between the output conduit 140 and the relief vessel 200. The first relief conduit 160, the second relief conduit 170, and the third relief conduit 180 can each, independently, comprise any suitable type, configuration, and size of conduit generally configured to provide fluid communication, as disclosed herein. Examples of suitable conduits include, but are not limited to, pipe or tubing formed from one or more materials such as ceramics, glass, fiberglass, metals and alloys thereof, concrete, and combinations thereof.

The embodiment of FIG. 1 illustrates each of the first relief conduit 160, the second relief conduit 170, and the third relief conduit 180 being directed to a single relief vessel (i.e., relief vessel 200); that is relief conduits from multiple sources are directed to a single relief vessel. In additional or alternative embodiments, each relief conduit from each single given source of sulfur trioxide can be directed to a designated, counterpart single relief vessel; alternatively, relief conduits from a single particular source of sulfur trioxide can be directed to multiple relief vessels (e.g., two, three, four, or five relief vessels); or combinations thereof. Also, and as previously noted, while the embodiment of FIG. 1 illustrates particular sources of sulfur trioxide (i.e., the storage vessel 120, the reactor 130, and the output conduit 140), any point within a STEC system (e.g., like STEC system 100) from which sulfur trioxide is present can serve as a sulfur trioxide source and, in such an embodiment, one or more additional conduits can be similarly configured to direct a volume of sulfur trioxide to a relief vessel like relief vessel 200.

Figure 2:
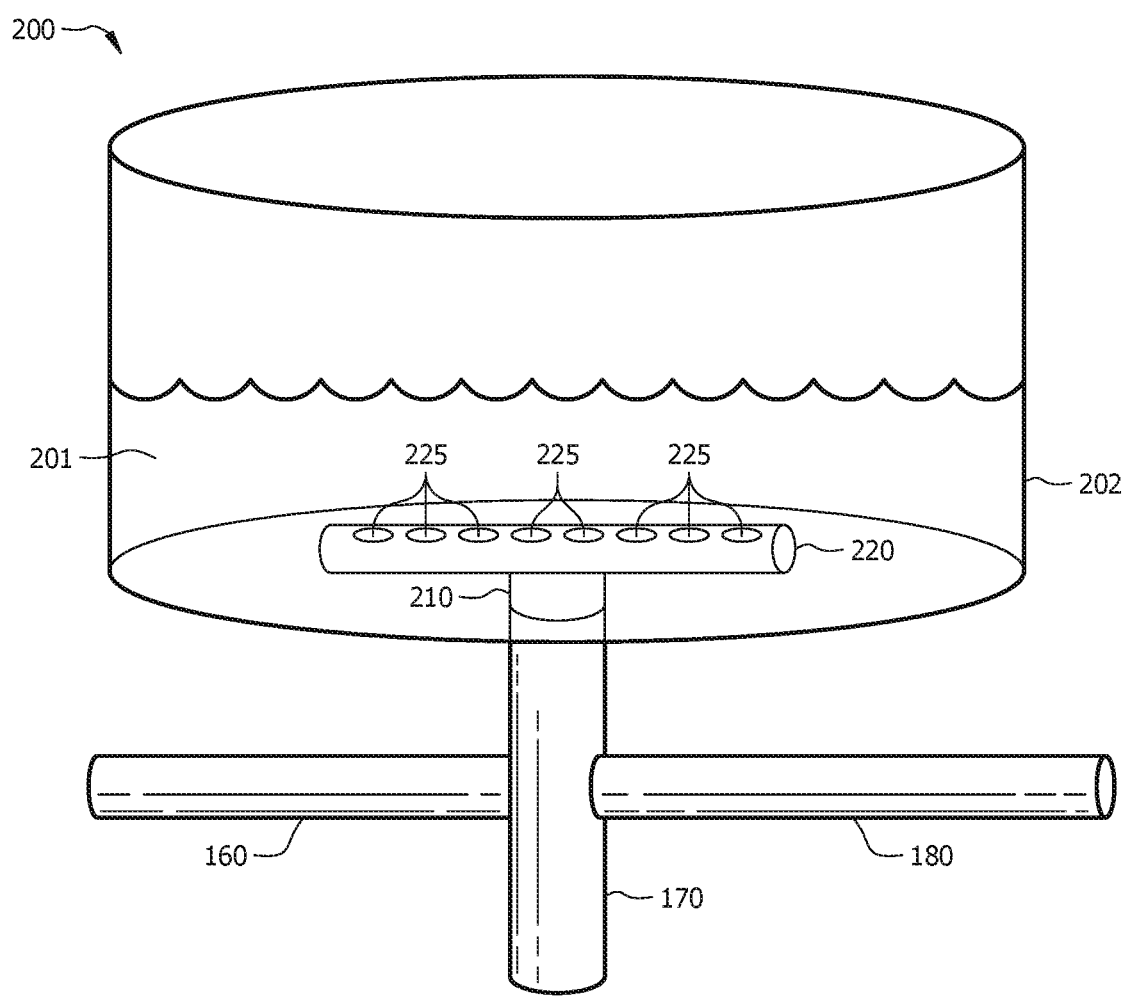
FIG. 2 illustrates an embodiment of a relief vessel.

Referring to FIG. 2, details of an embodiment of an exemplary relief vessel 200 is illustrated. In the embodiment of FIG. 2, the relief vessel 200 generally comprises a permanent or semi-permanent fixture at the site of the STEC system 100, for example, a tank or tank battery, or the like. Alternatively, the relief vessel 200 can comprise a mobile or movable vessel, for example a rail-car container, a trailer container, a tote, a skid-mounted container, or the like. In the embodiment of FIG. 2, the relief vessel 200 is fully enclosed. Alternatively, the relief vessel 200 is substantially or partially enclosed. Additionally, in an embodiment, the relief vessel 200 can comprise one or more vents, for example, for the purpose of regulating pressure within the relief vessel 200.

In the embodiment of FIG. 2, the relief vessel 200 retains a volume of a solvent solution 201 within its wall or walls 202. The relief vessel 200 can be sized to retain both the volume of solvent solution and a volume of sulfur trioxide, for example, a volume of sulfur trioxide as can be anticipated to be collected from one or more of the sources of sulfur trioxide (e.g., the storage vessel 120, the reactor 130, and the output conduit 140).

In an embodiment of the present disclosure, the solvent solution 201 comprises sulfolane (tetramethylene sulfone; tetrahydrothiophene 1,1-dioxide; or 2,3,4,5-tetrahydrothiophene-1,1-dioxide). Sulfolane is an organosulfur compound having formula $(CH_2)_3SO_4$ and shown below as compound (I):

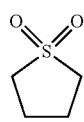

Compound (I)

In an embodiment, the solvent solution comprises at least 60%, by weight, sulfolane, alternatively, at least 70 wt. %, alternatively, at least 80 wt. %, alternatively, at least 90 wt. %, alternatively, at least 95 wt. %, alternatively, at least 96 wt. %, alternatively, at least 97 wt. %, alternatively, at least 97.5 wt. %, alternatively, at least 98 wt. %, alternatively, at least 98.5 wt. %, alternatively, at least 99.0 wt. %, alternatively, at least 99.1 wt. %, alternatively, at least 99.2 wt. %, alternatively, at least 99.3 wt. %, alternatively, at least 99.4 wt. %, alternatively, at least 99.5 wt. %, alternatively, at least 99.6 wt. %, alternatively, at least 99.7 wt. %, alternatively, at least 99.8 wt. %, alternatively, at least 99.9 wt. %, alternatively, at least 99.95 wt. % sulfolane.

In an embodiment, the sulfolane present within the solvent solution can be effective to absorb a volume of sulfur trioxide introduced into the solvent solution. That is, a volume of sulfur trioxide introduced into the sulfolane-containing solvent solution can be sequestered (e.g., absorbed by) without reacting with the sulfolane. For example, and again not intending to be bound by theory, sulfolane can be effective to sequester (e.g., absorb) about 30 mol. % of sulfur trioxide therein.

In an embodiment, the solvent solution can further comprise water. For example, the solvent solution can comprise about 0.5 wt. % water, alternatively, about 1.0 wt. % water, alternatively, about 1.5 wt. % water, alternatively, about 2.0 wt. % water, alternatively, about 2.5 wt. % water, alternatively, about 3.0 wt. % water. Not intending to be bound by theory, inclusion of water (e.g., a relatively small percentage of water) within the sulfolane-containing solvent solution can be effective to improve one or more operational parameters of the solvent solution. For example, inclusion of water within the sulfolane-containing solvent solution can be effective to depress the freezing point of the sulfolane and/or to improve the loading capabilities of the sulfolane. For instance, a solvent solution containing sulfolane and about 3 wt. % of water can exhibit an increase in sulfur trioxide loading capacity (e.g., absorption) of about 5% (e.g., about 35 mol. % of sulfur trioxide can be dissolved therein).

In an embodiment, the solvent solution comprises one or more additives. Examples of such additives include but are not limited to linear alkane hydrocarbons preferably in the C10-C14 range or isoparraffins in the C12-C18 range. In an embodiment where an additive is present, the additive can be present in an amount sufficient to yield a desired effect, for example, as can be dependent upon the additive and/or its desired effect within the solvent solution. In an embodiment, the solvent solution further comprises a dispersed fluid, for example, a volume of a fluid dispersed within the sulfolane. In such an embodiment, the dispersed fluid comprises an organic compound, examples of which include linear alkane hydrocarbons preferably in the C10-C14 range or isoparraffins in the C12-C18 range. In an embodiment where the solvent solution comprises a dispersed fluid, the dispersed fluid can be present in a quantum sufficient (e.g., q.s.) amount to yield a solvent solution comprising sulfolane, water, and/or additives present in a desired percentage (e.g., as disclosed herein). For example, the solvent solution can comprise about 30%, by weight, dispersed fluid, alternatively, about 20 wt. %, alternatively, about 10 wt. %, alternatively, about 5 wt. %, alternatively, about 2.5 wt. %, alternatively, about 2 wt. %, alternatively, about 1 wt. %, alternatively, less than 1 wt. %.

Referring again to FIG. 2, the relief vessel 200 is configured to collect sulfur trioxide from one or more sulfur trioxide sources. For example, in the embodiment of FIG. 2 the first relief conduit 160, the second relief conduit 170, and the third relief conduit 180 are received by the relief vessel 200 via a common input conduit 210 (e.g., a manifold).

In an embodiment, the relief vessel 200 can be configured to encourage dissipation of a volume of sulfur trioxide in the solvent solution retained therein. For example, in the embodiment of FIG. 2, the sulfur trioxide is introduced into the relief vessel 200 via a bubbler 220, for example, having a plurality of holes 225 to encourage dispersion of the sulfur trioxide in the solvent solution. The bubbler 220 can be of any suitable size and shape such as one or more rods, a circular pan, and the like. In additional embodiments, the relief vessel can comprise, for example, a circulatory pump (not shown) to encourage dispersion of the sulfur trioxide in the solvent solution.

Referring again to the embodiment of FIG. 1, the STEC system 100 can further comprise a solvent regeneration system 190. The solvent regeneration system is generally configured to provide an environment in which a solvent solution having sulfur trioxide dissolved therein (e.g., an "emission mixture") may be regenerated to form a usable solvent solution. The STEC system 100 further comprises an emission mixture conduit 191 and a regenerated solvent solution conduit 192, providing routes of fluid communication from the relief vessel 200 to the solvent regeneration system 190 and from the solvent regeneration system 190 to the relief vessel 200.

Also disclosed herein are methods of containing an emission of sulfur trioxide. For example, referring to FIG. 3, an embodiment of STEC method 300 is illustrated graphically.

Figure 3:
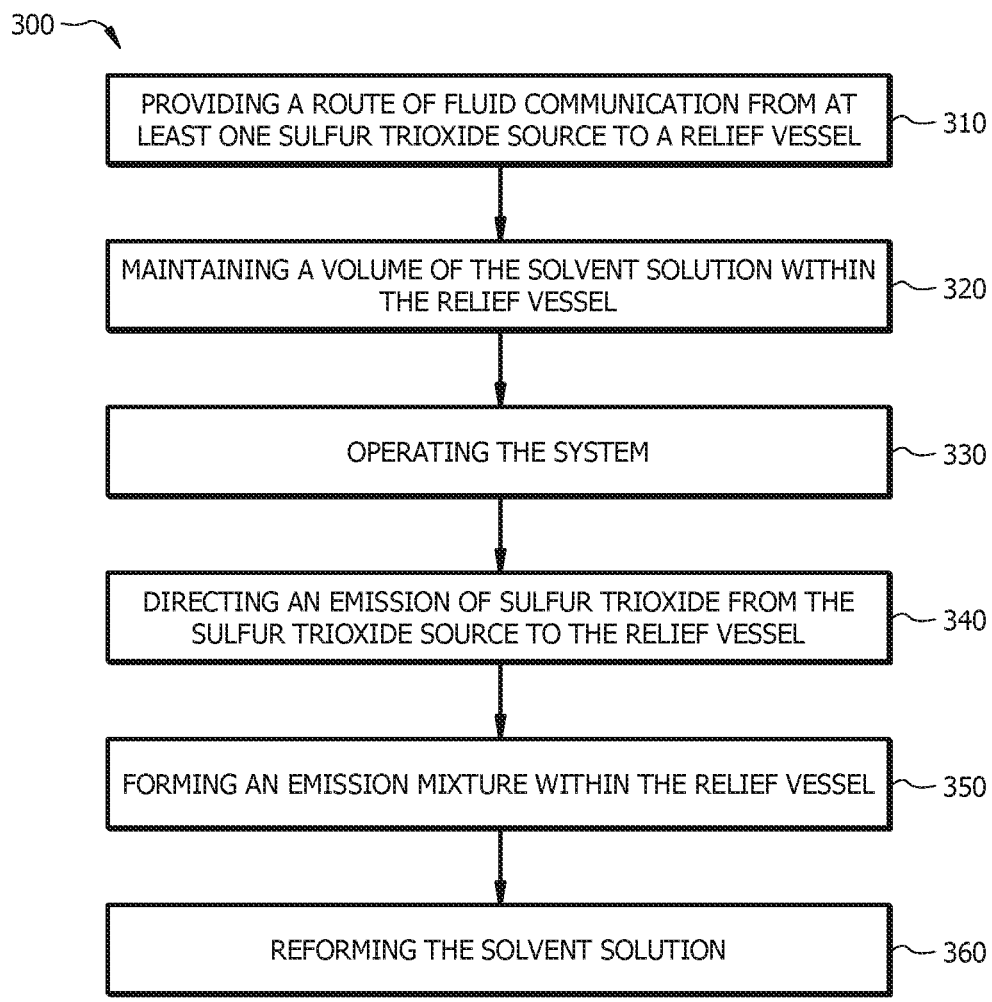
FIG. 3 illustrates an embodiment of sulfur trioxide emission containment method.

In the embodiment of FIG. 3, the STEC method 300 comprises a step 310 of providing a route of fluid communication from at least one sulfur trioxide source to a relief vessel. For example, in the context of the embodiment of FIG. 1, as previously disclosed herein, a route of fluid communication (e.g., the first relief conduit 160, the second relief conduit 170, and the third relief conduit 180) is provided from each of three sources of sulfur trioxide (e.g., the storage vessel 120, the reactor 130, and the output conduit 140) to the relief vessel 200. In alternative embodiments, and as previously noted, the sulfur trioxide source can comprise any point at which sulfur trioxide is present within a system. For example, in the context of a laboratory environment, the sulfur trioxide source can comprise a fume hood.

Referring again to the embodiment of FIG. 3, the STEC method 300 also comprises a step 320 of maintaining a volume of the solvent solution within the relief vessel. As previously disclosed herein, the solvent solution can comprise sulfolane and, optionally, water. As will be further described herein, providing the route of fluid communication from the at least one sulfur trioxide source to the relief vessel and maintaining the volume of the solvent solution within the relief vessel enables an emission of sulfur trioxide to be collected and controlled, as will be disclosed herein.). The solvent solution can be maintained at a suitable temperature and pressure. In an embodiment, the solvent solution is maintained at about atmospheric pressure and at a temperature that is about the freezing point of the solvent solution (e.g., sulfolane or the water sulfolane mixture, or the parraffin-sulfolane dispersion).

Additionally, in the embodiment of FIG. 3, the STEC method 300 comprises the step 330 of operating the system (e.g., the overall system of which the STEC system is a part such as an asphalt sulfonation unit) for its intended purpose. For example, in the embodiment of FIG. 1, the STEC system 100 comprises an industrial setting 102, for example, an industrial environment in which sulfur trioxide is present (e.g., used as a reactant) in an industrial process. In such an embodiment, operating the system can comprise transferring the sulfur trioxide from the first storage vessel to the reactor, forming a reaction mixture comprising the sulfur trioxide and a second reactant (e.g., asphalt, in an embodiment where the system is for the purpose of producing sulfonated asphalt), and reacting the sulfur trioxide with the second reactant (e.g., the asphalt) to yield a desired product (e.g., sulfonated asphalt).

In another embodiment where the STEC system comprises, as an example, a laboratory setting, for example, where sulfur trioxide source can comprise a fume hood, operating the system can comprise operating the fume hood, for example, to evacuate a volume of air having or potentially having sulfur trioxide.

As will be appreciate by the person of ordinary skill in the art upon viewing this disclosure, the operation of various systems where sulfur trioxide is present can result in various emissions or point sources of sulfur trioxide. Some emissions of sulfur trioxide can be expected while others can be unexpected. For example, referring to the embodiment of FIG. 3, an emission of sulfur trioxide from the storage vessel 120 or the reactor 130 can unexpectedly result from the normal operation of STEC system 100. For example, the storage vessel 120 can unexpectedly emit sulfur trioxide (e.g., via vent 124) upon an over-pressuring of the storage vessel 120 or a malfunction of the pressure relief valve 126 or the heating element 122 (e.g., where the heating element causes the sulfur trioxide within the storage vessel 120 to overheat). Similarly, the reactor 130 can unexpectedly emit sulfur trioxide upon an over-pressuring or other operating upset of the reactor 130.

Alternatively, an emission of sulfur trioxide via the output conduit 140 can be expected. For example, in some embodiments where sulfur trioxide is employed as a reactant, at least some excess sulfur trioxide can be emitted from the reactor 130 and, as such, can be collected during the normal operation of the system. In such embodiments, the relief vessel 200 can serve as emissions control equipment, such as an off gas scrubber.

Referring again to the embodiment of FIG. 3, the STEC method 300 further comprises a step 340 of directing an emission of sulfur trioxide from the sulfur trioxide source to the relief vessel For example, and referring to the embodiment of FIG. 1, where sulfur trioxide is emitted, whether expectedly or unexpectedly, the emission of sulfur trioxide can be collected from the storage vessel 120 (e.g., via the vent 124) and directed to the relief vessel 200 via the first relief conduit 160, additionally or alternatively, from the reactor 130 (e.g., via the vent 134) and directed to the relief vessel 200 via the second relief conduit 170, additionally or alternatively, from the output conduit 140 and directed to the relief vessel 200 via the third relief conduit 180.

With continued reference to FIG. 3, the STEC method 300 further comprises the step 350 of forming an emission mixture within the relief vessel. For example, referring again to the embodiment of FIGS. 1 and 2, the sulfur trioxide is introduced into the relief vessel 200 (e.g., from the first relief conduit 160, the second relief conduit 170, and/or the third relief conduit 180) via the common input conduit (e.g., a manifold 210) and disperses within the solvent solution 201 retained within the relief vessel 200, thereby forming the emission mixture. In an embodiment, the sulfur trioxide is introduced (e.g., dispersed) within the solvent solution via the bubbler 220. The solvent solution can be effective to sequester an amount of sulfur trioxide; for example, the sulfolane can be effective to absorb an amount of sulfur trioxide. For example, the emission mixture formed within the relief vessel 200 can comprise sulfur trioxide dissolved in (e.g., absorbed by) sulfolane within the relief vessel. In an embodiment, the emission mixture formed within the relief vessel 200 comprises up to about 30 mol. % of sulfur trioxide to be dissolved therein, alternatively, up to about 31 mol. % of sulfur trioxide, alternatively, up to about 32 mol. % of sulfur trioxide, alternatively, up to about 33 mol. % of sulfur trioxide, alternatively, up to about 34 mol. % of sulfur trioxide, alternatively, up to about 35 mol. % of sulfur trioxide. For instance, for each mole of sulfolane in the solvent solution, the solvent solution can be effective to absorb about 0.30 moles of sulfur trioxide, alternatively, about 0.31 moles of sulfur trioxide, alternatively, about 0.32 moles of sulfur trioxide, alternatively, about 0.33 moles of sulfur trioxide, alternatively, about 0.34 moles of sulfur trioxide, alternatively, about 0.35 moles of sulfur trioxide.

The STEC method 300 further comprises a step 360 of reforming the solvent solution. In accordance with this process or method, reforming the solvent solution comprises adding water to the emission mixture. Referring again to FIG. 1, the emission mixture can be conveyed to the solvent regeneration system 190, for example, via the emission mixture conduit 191. In an embodiment, water added to the emission mixture can react with the sulfur trioxide dissolved therein to form sulfuric acid. The reaction between sulfur trioxide and water can be highly exothermic and, as such, the water added to the emission mixture can be added slowly over an extended period of time and in a controlled manner, for example, to allow the heat produced by the reaction to dissipate. The sulfuric acid resulting from the reaction can remain dissolved in the solvent solution (e.g., in the sulfolane). The sulfolane can be regenerated at a later point, for example, via a distillation, a back-extraction, adsorption, or counter-ion exchange column. The regenerated sulfolane can then be returned or recycled back to the relief vessel 200, for example, via the regenerated solvent solution conduit 192, to further absorb any additional release of sulfur trioxide.

Additional Embodiments

A first embodiment, which is a system for containing an emission of sulfur trioxide, the system comprising a first pressurized vessel, the first pressurized vessel containing sulfur trioxide; a relief vessel containing a volume of a solvent solution, wherein the solvent solution comprises sulfolane; and a first relief conduit providing a first route of fluid communication between the first pressurized vessel and the relief vessel.

A second embodiment, which is the system of the first embodiment, wherein the first pressurized vessel is a storage vessel.

A third embodiment, which is the system of one of first through the second embodiments, wherein the storage vessel includes an internal heating element configured to heat the sulfur trioxide.

A fourth embodiment, which is the system of one of first through the third embodiments, further comprising a second pressurized vessel; and a second relief conduit providing a second route of fluid communication between the second pressurized vessel and the relief vessel.

A fifth embodiment, which is the system of the fourth embodiment, wherein the second pressurized vessel is a reactor, wherein the reactor contains a reaction mixture.

A sixth embodiment, which is the system of the fifth embodiment, wherein the reaction mixture comprises sulfur trioxide and asphalt.

A seventh embodiment, which is the system of one of the first through the sixth embodiments, wherein the first pressurized vessel is a reactor, and wherein the sulfur trioxide within the reactor is a component of a reaction mixture contained within the reactor.

An eighth embodiment, which is the system of the seventh embodiment, wherein the reaction mixture further comprises asphalt.

A ninth embodiment, which is the system of one of the first through the eighth embodiments, wherein the solvent solution further comprises water.

A tenth embodiment, which is the system of the ninth embodiment, wherein the solvent solution further comprises at least 1 weight % water on the basis of the sulfolane.

An eleventh embodiment, which is the system of the ninth embodiment, wherein the solvent solution further comprises at least 2 weight % water on the basis of the sulfolane.

A twelfth embodiment, which is the system of the ninth embodiment, wherein the solvent solution further comprises at least 3 weight % water on the basis of the sulfolane.

A thirteenth embodiment, which is the system of one of the first through the twelfth embodiments, further comprising a pressure relief valve, wherein the pressure relief valve controls fluid communication via the first route of fluid communication between the first pressurized vessel and the relief vessel.

A fourteenth embodiment, which is a method for containing an emission of sulfur trioxide, the method comprising routing a first relief conduit so as to provide a first route of fluid communication between a first pressurized vessel and a relief vessel, wherein the first pressurized vessel contains sulfur trioxide, wherein the relief vessel contains a volume of a solvent solution, and wherein the solvent solution comprises sulfolane.

A fifteenth embodiment, which is the method of the fourteenth embodiment, wherein the first pressurized vessel is a storage vessel.

A sixteenth embodiment, which is the method of the fifteenth embodiment, wherein the storage vessel includes an internal heating element configured to heat the sulfur trioxide.

A seventeenth embodiment, which is the method of one of the fourteenth through the sixteenth embodiments, further comprising routing a second relief conduit so as to provide a second route of fluid communication between a second pressurized vessel and the relief vessel, wherein the second pressurized vessel contains sulfur trioxide.

An eighteenth embodiment, which is the method of the seventeenth embodiment, wherein the second pressurized vessel is a reactor, and wherein the method further comprises communicating the sulfur trioxide from the first storage vessel to the reactor.

A nineteenth embodiment, which is the method of the eighteenth embodiment, further comprising introducing asphalt into the reactor.

A twentieth embodiment, which is the method of the nineteenth embodiment, further comprising forming a reaction mixture comprising the sulfur trioxide and the asphalt; and reacting the sulfur trioxide with the asphalt to yield a sulfonated asphalt.

A twenty-first embodiment, which is the method of one of the fourteenth through the twentieth embodiments, wherein the first pressurized vessel is a reactor, and wherein the sulfur trioxide within the reactor is a component of a reaction mixture contained within the reactor.

A twenty-second embodiment, which is the method of the twenty-first embodiment, wherein the reaction mixture further comprises asphalt.

A twenty-third embodiment, which is the method of the twenty-second embodiment, further comprising forming a reaction mixture comprising the sulfur trioxide and the asphalt; and reacting the sulfur trioxide with the asphalt to yield a sulfonated asphalt.

A twenty-fourth embodiment, which is the method of one of the fourteenth through the twenty-third embodiments, wherein the solvent solution further comprises water.

A twenty-fifth embodiment, which is the method of the twenty-fourth embodiment, wherein the solvent solution further comprises at least 1 weight % water on the basis of the sulfolane.

A twenty-sixth embodiment, which is the method of the twenty-fourth embodiment, wherein the solvent solution further comprises at least 2 weight % water on the basis of the sulfolane.

A twenty-seventh embodiment, which is the method of the twenty-fourth embodiment, wherein the solvent solution further comprises at least 3 weight % water on the basis of the sulfolane.

A twenty-eighth embodiment, which is the method of one of the fourteenth through the twenty-seventh embodiments, further comprising controlling fluid communication via the first route of fluid communication between the first pressurized vessel and the relief vessel via a pressure relief valve.

A twenty-ninth embodiment, which is a method for containing an emission of sulfur trioxide, the method comprising directing an emission of sulfur trioxide from a first pressurized vessel to a relief vessel via a first relief conduit, wherein the relief vessel contains a volume of a solvent solution, comprising sulfolane; and forming an emission mixture comprising sulfur trioxide dissolved in sulfolane within the relief vessel.

A thirtieth embodiment, which is the method of the twenty-ninth embodiment, wherein the first pressurized vessel is a storage vessel.

A thirty-first embodiment, which is the method of the thirtieth embodiment, further comprising heating the sulfur trioxide via an internal heating element within the storage vessel.

A thirty-second embodiment, which is the method of one of the twenty-ninth through the thirty-first embodiments, wherein the first pressurized vessel is a reactor, wherein the sulfur trioxide within the reactor is a component of a reaction mixture contained within the reactor.

A thirty-third embodiment, which is the method of the thirty-second embodiment, further comprising introducing asphalt into the reactor.

A thirty-fourth embodiment, which is the method of the thirty-third embodiment, further comprising forming the reaction mixture, wherein the reaction mixture comprises the sulfur trioxide and the asphalt; and reacting the sulfur trioxide with the asphalt to yield a sulfonated asphalt.

A thirty-fifth embodiment, which is the method of one of the twenty-ninth through the thirty-fourth embodiments, wherein the solvent solution further comprises water.

A thirty-sixth embodiment, which is the method of the thirty-fifth embodiment, wherein the solvent solution further comprises at least 1 weight % water on the basis of the sulfolane.

A thirty-seventh embodiment, which is the method of the thirty-fifth embodiment, wherein the solvent solution further comprises at least 2 weight % water on the basis of the sulfolane.

A thirty-eighth embodiment, which is the method of the thirty-fifth embodiment, wherein the solvent solution further comprises at least 3 weight % water on the basis of the sulfolane.

A thirty-ninth embodiment, which is the method of one of the twenty-ninth through the thirty-eighth embodiments, further comprising adding water to the emission mixture.

A fortieth embodiment, which is the method of one of the twenty-ninth through the thirty-ninth embodiments, wherein the emission of sulfur trioxide from the first pressurized vessel to the relief vessel via the first relief conduit is allowed via operation of a pressure relief valve.

A forty-first embodiment, which is a method for containing an emission of sulfur trioxide, the method comprising directing an emission comprising sulfur trioxide to a relief vessel, wherein the relief vessel contains a volume of a solvent solution, and wherein the solvent solution comprises sulfolane; and forming an emission mixture comprising sulfur trioxide dissolved in sulfolane within the relief vessel.

A forty-second embodiment, which is the method of the forty-first embodiment, wherein the emission comprising sulfur trioxide is captured from a first pressurized vessel.

A forty-third embodiment, which is the method of the forty-second embodiment, wherein the first pressurized vessel is a storage vessel.

A forty-fourth embodiment, which is the method of the forty-third embodiment, further comprising heating the sulfur trioxide via an internal heating element within the storage vessel.

A forty-fifth embodiment, which is the method of one of the forty-second through the forty-fourth embodiments, wherein the first pressurized vessel is a reactor, and wherein the sulfur trioxide within the reactor is a component of a reaction mixture contained within the reactor.

A forty-sixth embodiment, which is the method of one of the forty-first through the forty-fifth embodiments, wherein the solvent solution further comprises water.

A forty-seventh embodiment, which is the method of the forty-sixth embodiment, wherein the solvent solution further comprises at least 1 weight % water on the basis of the sulfolane.

A forty-eighth embodiment, which is the method of claim the forty-sixth embodiment, wherein the solvent solution further comprises at least 2 weight % water on the basis of the sulfolane.

A forty-ninth embodiment, which is the method of the forty-sixth embodiment, wherein the solvent solution further comprises at least 3 weight % water on the basis of the sulfolane.

A fiftieth embodiment, which is the method of one of the forty-first through the forty-ninth embodiments, further comprising adding water to the emission mixture.

A fifty-first embodiment, which is the method of fiftieth embodiment, further comprising regenerating the solvent solution from the emission mixture, wherein regenerating the solvent solution comprises removing sulfuric acid from the emission mixture after adding water to the emission mixture.

A fifty-second embodiment, which is the method of fifty-first embodiment, further comprising retaining the regenerated solvent solution in a relief vessel.

While embodiments of the disclosure have been shown and described, modifications thereof can be made without departing from the spirit and teachings of the invention. The embodiments and examples described herein are exemplary only, and are not intended to be limiting. Many variations and modifications of the invention disclosed herein are possible and are within the scope of the invention.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., includes, for example, from about 1 to about 10 includes, 2, 3, 4 greater than 0.10 includes 0.11, 0.12, 0.13.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent . . . 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of.

Each and every claim is incorporated into the specification as an embodiment of the present invention. Thus, the claims are a further description and are an addition to the detailed description of the present invention.

What is claimed is:

1. A system for containing an emission of sulfur trioxide, the system comprising:
    a first pressurized vessel, the first pressurized vessel containing sulfur trioxide and wherein the first pressurized vessel is a storage vessel;
    a relief vessel containing a volume of a solvent solution, wherein the solvent solution comprises sulfolane;
    a first relief conduit providing a first route of fluid communication between the first pressurized vessel and the relief vessel;
    a second pressurized vessel, wherein the second pressurized vessel is a reactor and wherein the reactor contains a reaction mixture;
    a second relief conduit providing a second route of fluid communication between the second pressurized vessel and the relief vessel;
    a separation unit; and
    a third relief conduit providing a third route of fluid communication between the separation unit and the relief vessel,
    wherein an effluent stream conveyed from the reactor is separated into an output conduit and a product conduit by the separation unit, the output conduit comprising the third relief conduit.

2. The system of claim 1, wherein the storage vessel includes an internal heating element configured to heat the sulfur trioxide.

3. The system of claim 1, further comprising a pressure relief valve, wherein the pressure relief valve controls fluid communication via the first route of fluid communication between the first pressurized vessel and the relief vessel.

4. The system of claim 1, wherein the effluent stream comprises product and unreacted components.

5. The system of claim 1, wherein the product conduit comprises at least one of sulfonated asphalt, alcohol sulfuric acid, alkyl benzene sulfonic acid, petroleum sulfonates, or oleum.

6. The system of claim 1, further comprising:
    a solvent regeneration system; and
    a regenerated solvent solution conduit conveying regenerated solvent to the relief vessel from the solvent regeneration system.

7. The system of claim 1, wherein for each mole of sulfolane in the solvent solution, the solvent solution is effective to absorb between about 0.30 moles to about 0.35 moles of sulfur trioxide.

8. The system of claim 1, further comprising a bubbler disposed at a bottom of the relief vessel and configured to disperse the sulfur trioxide into the solvent solution.

9. A system for containing an emission of sulfur trioxide, the system comprising:
    a first pressurized vessel, the first pressurized vessel containing sulfur trioxide and wherein the first pressurized vessel is a storage vessel;
    a relief vessel containing a volume of a solvent solution, wherein the solvent solution comprises sulfolane;
    a first relief conduit providing a first route of fluid communication between the first pressurized vessel and the relief vessel;
    a second pressurized vessel wherein the second pressurized vessel is a reactor and wherein the reactor contains a reaction mixture; and
    a second relief conduit providing a second route of fluid communication between the second pressurized vessel and the relief vessel,
    wherein the reaction mixture comprises asphalt.

10. The system of claim 1, wherein the solvent solution further comprises water.

11. The system of claim 10, wherein the solvent solution further comprises at least 2 wt % water on a basis of the sulfolane.

12. The system of claim 10, wherein the solvent solution further comprises at least 3 wt % water on a basis of the sulfolane.

13. The system of claim 9, wherein the storage vessel includes an internal heating element configured to heat the sulfur trioxide.

14. The system of claim 9, wherein the solvent solution further comprises water.

15. The system of claim 14, wherein the solvent solution further comprises at least 2 wt % water on a basis of the sulfolane.

16. The system of claim 14, wherein the solvent solution further comprises at least 3 wt % water on a basis of the sulfolane.

17. The system of claim 9, further comprising a pressure relief valve, wherein the pressure relief valve controls fluid communication via the first route of fluid communication between the first pressurized vessel and the relief vessel.

18. The system of claim 9, further comprising:
    a separation unit; and
    a third relief conduit providing a third route of fluid communication between the separation unit and the relief vessel,
    wherein an effluent stream conveyed from the reactor is separated into an output conduit and a product conduit by the separation unit, the output conduit comprising the third relief conduit.

* * * * *